(12) United States Patent
Petisce et al.

(10) Patent No.: US 12,553,020 B2
(45) Date of Patent: Feb. 17, 2026

(54) DEVICES, SYSTEMS, AND METHODS FOR CONTINUOUS REAL TIME BLOOD CULTURE MEASUREMENT

(71) Applicant: Becton, Dickinson and Company, Franklin Lakes, NJ (US)

(72) Inventors: James R. Petisce, Westford, MA (US); Adam Steel, Fallston, MD (US); Robert E. Armstrong, Hunt Valley, MD (US); David J. Turner, York, PA (US); Richard Ivey, Parkton, MD (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 794 days.

(21) Appl. No.: 17/310,154

(22) PCT Filed: Jan. 21, 2020

(86) PCT No.: PCT/US2020/014433
§ 371 (c)(1),
(2) Date: Jul. 21, 2021

(87) PCT Pub. No.: WO2020/154299
PCT Pub. Date: Jul. 30, 2020

(65) Prior Publication Data
US 2022/0056396 A1 Feb. 24, 2022

Related U.S. Application Data

(60) Provisional application No. 62/795,911, filed on Jan. 23, 2019.

(51) Int. Cl.
| C12M 1/34 | (2006.01) |
| C12M 1/24 | (2006.01) |
| C12M 1/26 | (2006.01) |
| C12Q 1/06 | (2006.01) |
| G01N 21/64 | (2006.01) |
(Continued)

(52) U.S. Cl.
CPC ............ *C12M 41/26* (2013.01); *C12M 23/08* (2013.01); *C12M 33/14* (2013.01); *C12Q 1/06* (2013.01);
(Continued)

(58) Field of Classification Search
CPC ...... C12M 41/26; C12M 23/08; C12M 33/14; C12Q 1/06; G01N 21/6428;
(Continued)

(56) References Cited

U.S. PATENT DOCUMENTS

| 4,654,197 A | 3/1987 | Lilja et al. |
| 4,816,130 A * | 3/1989 | Karakelle ............... G01N 27/40 257/253 |

(Continued)

FOREIGN PATENT DOCUMENTS

| JP | 02016965 A | 1/1990 |
| JP | H04505256 A | 9/1992 |

(Continued)

OTHER PUBLICATIONS

"Bottle." Merriam-Webster.com. 2025. https://www.merriam-webster.com/dictionary/bottle. (Year: 2025).*
(Continued)

*Primary Examiner* — Robert B Mondesi
*Assistant Examiner* — Naghmeh Nina Moazzami
(74) *Attorney, Agent, or Firm* — Knobbe, Martens, Olson & Bear, LLP

(57) ABSTRACT

Provided herein are devices, systems, and methods for measuring the presence of an analyte of interest in a sample. Certain embodiments of the present disclosure are related to culture measurement systems that include a culture vial and a sensor, wherein the sensor is a pH sensor, a responsive
(Continued)

label, or an indicator compound, such that the sensor is incorporated into the culture vial for measurement of the pH of the sample.

13 Claims, 5 Drawing Sheets

(51) Int. Cl.
  *G01N 27/414* (2006.01)
  *G01N 33/49* (2006.01)
(52) U.S. Cl.
  CPC ..... *G01N 21/6428* (2013.01); *G01N 27/4145* (2013.01); *G01N 33/49* (2013.01); *G01N 2021/6439* (2013.01)
(58) Field of Classification Search
  CPC ............... G01N 27/4145; G01N 33/49; G01N 2021/6439; G01N 2021/775; G01N 2021/7786; G01N 21/77; G01N 21/80; G01N 27/4167; G01N 27/4165
  See application file for complete search history.

(56) References Cited

U.S. PATENT DOCUMENTS

| | | | | |
|---|---|---|---|---|
| 4,945,060 A | * | 7/1990 | Turner | ................... C12M 41/26 435/7.32 |
| 5,094,955 A | | 3/1992 | Calandra et al. | |
| 5,770,394 A | * | 6/1998 | Berndt | ................... G01N 33/52 435/808 |
| 5,770,440 A | * | 6/1998 | Berndt | ..................... C12Q 1/04 435/808 |
| 7,022,219 B2 | | 4/2006 | Mansouri et al. | |
| 2007/0298487 A1 | | 12/2007 | Bachur et al. | |
| 2008/0105566 A1 | | 5/2008 | Kitawaki et al. | |
| 2015/0247819 A1 | * | 9/2015 | Shi | ................... G01N 33/48735 506/13 |
| 2016/0122698 A1 | | 5/2016 | Suslick et al. | |
| 2017/0261464 A1 | | 9/2017 | Shi et al. | |

FOREIGN PATENT DOCUMENTS

| | | | | |
|---|---|---|---|---|
| JP | 2005345464 A | | 12/2005 | |
| JP | 2009541775 A | | 11/2009 | |
| JP | 4512363 B2 | | 7/2010 | |
| WO | WO 1990/014414 A1 | | 11/1990 | |
| WO | WO-2013036600 A2 | * | 3/2013 | ......... A61B 5/14539 |
| WO | WO 2013/109267 A1 | | 7/2013 | |
| WO | WO 2020/005823 | | 1/2020 | |

OTHER PUBLICATIONS

European Extended Search Report dated Aug. 29, 2022 in Application No. 20745853.0, filed Aug. 2, 2021 (9 pages).
International Search Report issued in application No. PCT/US2020/014433, dated Apr. 2, 2020.

* cited by examiner

DEVICES, SYSTEMS, AND METHODS FOR CONTINUOUS REAL TIME BLOOD CULTURE MEASUREMENT

CROSS REFERENCE TO RELATED APPLICATION

This application is a U.S. National Phase Application of PCT International Application Number PCT/US2020/014433, filed on Jan. 21, 2020, designating the United States of America and published in the English language, which is an International Application of and claims the benefit of U.S. Provisional Application No. 62/795,911, filed Jan. 23, 2019, each of which is hereby incorporated by reference in its entirety.

BACKGROUND

Field

The present disclosure relates to culture measurement devices, systems and methods, such as, but not limited to, blood culture measurements systems for determining pH of a blood culture sample.

Description of the Related Art

In numerous fields (e.g., medicine, pharmaceuticals, the food industry), rapid and accurate determination of microorganism contamination in a particular system (e.g., a patient's blood, a batch of drug product, a food supply) is desirable. Methods employing sensors including fluorescent materials in conjunction with indicator materials have been developed for indirectly detecting microorganisms in a sample through their biological activities. For example, when microorganism are present in a culture vial, they metabolize nutrients in the culture, releasing carbon dioxide into the sample. The carbon dioxide reacts with a dye, modulating an amount of light absorbed by a sensor in the vial. A photodetector measures the level of absorbance (such as fluorescence measurement), which corresponds to an amount of carbon dioxide released by the microorganisms. Measurement systems employing these methods incorporate fluorescent sensors or detectors for detecting fluorescent signals emitted from a container or vial housing the sample and sensor. Software and/or hardware systems are then utilized for processing data collected by the detectors.

Currently available culture measurement systems have several limitations, including, for example, sensitivity of measurement variability, Delayed Vial Entry (DVE) time, inconsistency due to temperature fluctuations, delayed time to detection, multi-component sensor complexity, and lack of real time feedback on measurement system signal quality. In addition, these systems can include components that are difficult to acquire and difficult to incorporate into measurement vials. Furthermore, these limitations result in sensors that provide inconsistent results from one vial to the next. Embodiments of the disclosed technology solve or mitigate at least some of these and/or other drawbacks in blood culture measurement systems.

SUMMARY

Described herein are devices, systems and methods for measuring properties or characteristics in a sample that are subject to change over time, such as for measuring a change in pH in a sample.

Some embodiments provided herein relate to a device for measuring blood culture pH. In some embodiments, the device is a culture vial, such as a blood culture vial. In some embodiments, the vial comprises a pH sensor positioned on an interior surface of the culture vial, and configured to transmit a signal of pH measurement. In some embodiments, the pH sensor is an ion specific field effect transistor (ISFET) or an ion selective electrode. In some embodiments, the culture vial further includes a permeable membrane layer that separates the pH sensor from contents of the blood culture vial. In some embodiments, the permeable membrane comprises a polymeric material. In some embodiments, the permeable membrane comprises Nafion™ (a sulfonated tetrafluoroethylene based fluoropolymer-copolymer), polyurethane, or cellulosic material. In some embodiments, the culture vial is plastic or glass.

Some embodiments provided herein relate to a system comprising a culture vial, a reader configured to obtain a signal from a pH sensor. In some embodiments, the system further includes an electrical power source. In some embodiments, the device is a culture vial, such as a blood culture vial. In some embodiments, the vial comprises a pH sensor positioned on an interior surface of the culture vial, and configured to transmit a signal of pH measurement. In some embodiments, the pH sensor is an ion specific field effect transistor (ISFET) or an ion selective electrode. In some embodiments, the culture vial further includes a permeable membrane layer that separates the pH sensor from contents of the blood culture vial. In some embodiments, the permeable membrane comprises a polymeric material. In some embodiments, the permeable membrane comprises Nafion™ (a sulfonated tetrafluoroethylene based fluoropolymer-copolymer), polyurethane, or cellulosic material. In some embodiments, the culture vial is plastic or glass. In some embodiments, the pH sensor comprises electrical leads that pass through the blood culture vial and connect to the reader. In some embodiments, the electrical leads pass through a bottom portion of the blood culture vial or pass through a septum of the blood culture vial. In some embodiments, the pH sensor is configured to wirelessly communicate with the reader. In some embodiments, the reader is configured to wirelessly transmit analyzed data to an information management system or a cloud data storage location. In some embodiments, the reader is configured to transmit data to a hospital information management system, a research facility, or a clinical laboratory. In some embodiments, the pH sensor is configured to be wirelessly powered.

Some embodiments provided herein relate to a device for measuring blood culture pH. In some embodiments, the device is a culture vial, such as a blood culture vial. In some embodiments, the culture vial comprises a responsive label positioned on an inner surface of the culture vial. In some embodiments, the responsive label is configured to emit an absorbance intensity signal that corresponds to a pH measurement. In some embodiments, the responsive label comprises a pH responsive agent. In some embodiments, the pH responsive agent is fluorescent, phosphorescent, or colorimetric. In some embodiments, the responsive label comprises a permeable membrane that separates the responsive label from contents of the blood culture vial. In some embodiments, the permeable membrane comprises a polymeric material. In some embodiments, the permeable membrane comprises Nafion™ (a sulfonated tetrafluoroethylene based fluoropolymer-copolymer), polyurethane, or cellulosic material.

Some embodiments provided herein relate to a device for measuring blood culture pH. In some embodiments, the device is a culture vial, such as a blood culture vial. In some embodiments, the culture vial comprises an indicator compound incorporated directly into the culture vial. In some embodiments, the indicator compound is a pH responsive agent that is configured to be responsive to fluorescent, phosphorescent, or colorimetric excitation. In some embodiments, the indicator compound is a pigment, a dye, an organic compound, or an inorganic compound. In some embodiments, the culture vial comprises an impermeable membrane that covers a portion of the interior of the culture vial. In some embodiments, the blood culture vial is plastic or glass.

Some embodiments provided herein relate to a system comprising a culture vial and one or more detectors configured to measure an intensity of one or a plurality of signals emitted from the pH responsive agent after exposure to an interrogating energy source. In some embodiments, the device is a culture vial, such as a blood culture vial. In some embodiments, the culture vial comprises a responsive label positioned on an inner surface of the culture vial. In some embodiments, the responsive label is configured to emit an absorbance intensity signal that corresponds to a pH measurement. In some embodiments, the responsive label comprises a pH responsive agent. In some embodiments, the pH responsive agent is fluorescent, phosphorescent, or colorimetric. In some embodiments, the responsive label comprises a permeable membrane that separates the responsive label from contents of the blood culture vial. In some embodiments, the permeable membrane comprises a polymeric material. In some embodiments, the permeable membrane comprises Nafion™ (a sulfonated tetrafluoroethylene based fluoropolymer-copolymer), polyurethane, or cellulosic material. In some embodiments, the culture vial comprises an indicator compound incorporated directly into the culture vial. In some embodiments, the indicator compound is a pH responsive agent that is configured to be responsive to fluorescent, phosphorescent, or colorimetric excitation. In some embodiments, the indicator compound is a pigment, a dye, an organic compound, or an inorganic compound. In some embodiments, the culture vial comprises an impermeable membrane that covers a portion of the interior of the culture vial. In some embodiments, the blood culture vial is plastic or glass. In some embodiments, the system further comprises a wireless transmitter configured to wirelessly transmit analyzed data to an information management system, a cloud data storage location, or an electronic storage medium (e.g., hard drive).

Some embodiments provided herein relate to a method of measuring pH in a blood culture sample. In some embodiments, the method includes inoculating a culture vial as described herein with a blood culture sample; and measuring a pH of the blood culture sample by detecting a signal of pH measurement using a system as described herein. In some embodiments, the signal of pH measurement is obtained by measuring a fluorescent, phosphorescent, or colorimetric signal emitted from a sensor in the blood culture vial. In some embodiments, the method further includes measuring a pH of the blood culture sample at a second or subsequent time point. In some embodiments, the measured pH of the blood culture sample correlates to a measure of an amount of a pathogen in the blood culture sample. In some embodiments, the pathogen is bacteria or fungi. In some embodiments, the system comprises a processor that is configured to disregard measurements that fall above or below a sensitivity range. In some embodiments, the method further comprises wirelessly transmitting analyzed data to an information management system, a cloud data storage location, or an electronic storage medium (e.g., hard drive).

DETAILED DESCRIPTION

Any feature or combination of features described herein are included within the scope of the present disclosure provided that the features included in any such combination are not mutually inconsistent as will be apparent from the context, this description, and the knowledge of one skilled in the art. In addition, any feature or combination of features may be specifically excluded from any embodiment of the present disclosure. For purposes of summarizing the present disclosure, certain aspects, advantages, and novel features of the present disclosure are described herein. Of course, it is to be understood that not necessarily all such aspects, advantages, or features will be present in any particular embodiment of the present disclosure.

It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the present disclosure. Embodiments of the disclosed technology are described herein with reference to blood culture measurement devices systems, such as, but not limited to, the BD BACTEC™ blood culture device and system by Becton, Dickinson and Company. It will be understood, however, that embodiments of the disclosed technology are not limited to blood culture measurement devices and systems, and can be applied to other types of detection devices and systems.

Figure 1:
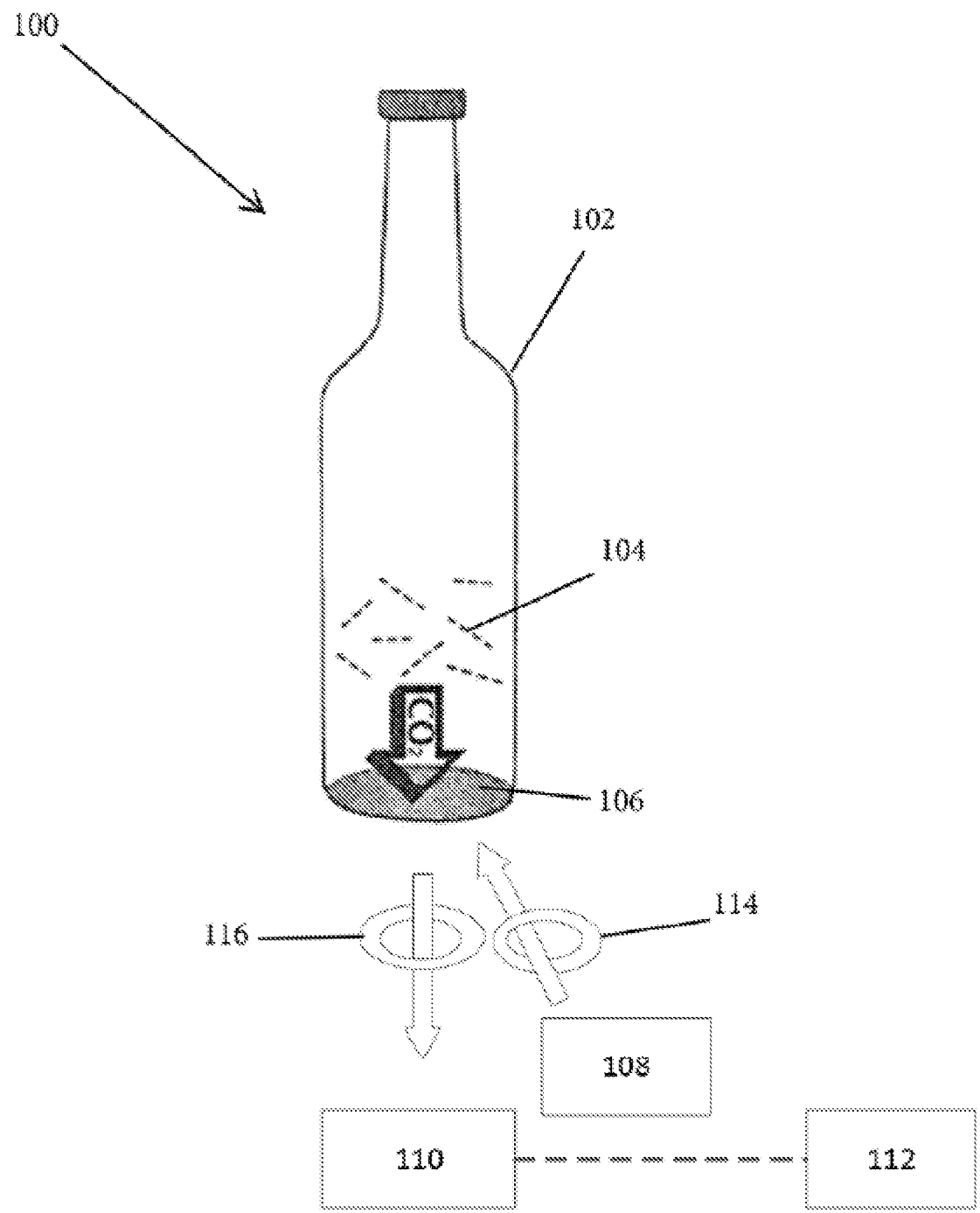
FIG. 1 depicts a schematic view of a sample measurement system based on fluorescent emission from carbon dioxide release.

Detection of blood-borne pathogens is an important function of microbiology laboratories. Cultures of blood are essential in identifying pathogens responsible for bacteremia and sepsis. Several automated blood culture systems are currently available. Some systems use fluorescent technology in detecting the growth of organism in a blood culture vial. FIG. 1 shows a schematic diagram of a currently available measurement system 100. As shown in FIG. 1, when microorganisms are present in a culture vial 102, they metabolize nutrients in the sample 104, releasing carbon dioxide into the sample. A dye sensor 106 in the culture vial 102 reacts with the carbon dioxide, modulating an amount of light absorbed by a fluorescent material in the sensor 106. A light source 108 may be incorporated to emit light to excite the fluorescent material of the sensor 106. A detector 110, such as a photodetector, measures the level of fluorescence, which corresponds to an amount of carbon dioxide released by the microorganisms. The system 100 may also include excitation filters 114 or emission filters 116 to filter a wavelength or range of wavelengths. A processor 112 may also be included in the system 100 to process the level of fluorescence for determining an amount or quantity of microorganismal growth in the sample. Such systems present several limitations, as described herein.

Embodiments of the devices, systems, and methods described herein overcome at least some of the limitations and drawbacks of the currently available culture measurement systems. In particular, embodiments of the devices, systems, and methods relate to a culture measurement system having a sensor positioned on an interior surface of a culture vial that directly measures pH of a sample placed within the culture vial. The sensor may be a pH sensor located within the vial, incorporated within a responsive label that is located within the vial, or incorporated into the measurement vial material itself. Also provided herein are methods of using the culture measurement systems, for example, for determination of pH, for determination of the presence, change, or quantity of a pathogen, or for the analysis of an analyte in the sample. Also provided are methods of making the culture measurement devices and systems.

Some of the embodiments of the devices, systems, and methods described herein include one or more advantages over currently available culture measurement systems, including, for example, eliminating sensitivity of measurement variability, reducing Delayed Vial Entry (DVE) time, reducing sensitivity due to temperature fluctuations, reducing delayed time to detection, eliminating multi-component aspect of current technologies, thereby reducing complexity in manufacture and reducing interruption of supply, and enabling real time feedback on measurement system signal quality.

In traditional culture measurement systems, an output of the measurement system at any particular time is generated based on a ratio of a current detector reading to an initial detector reading taken at the time the vial is first placed in the system ("time zero"). In these systems, the current detector readings are normalized by dividing subsequent detector readings by the initial detector reading at time zero. Defining the detector reading at any time as $i_{reading}$, the initial detector reading as $i_{reading\ \#1}$, and the time that the initial detector reading is taken as $t_{reading\ \#1}$, the variability of the reported measurement system reading provided to the end-user can be described by the following equation:

variability of reported measurement system reading=$\Delta(i_{reading}/i_{reading\ \#1})+\Delta t_{reading\ \#1}$.

As shown in this equation, a component contributing to the variability of the reported measurement system reading is any variability of the initial system reading designated as "$i_{reading\ \#1}$." This variability can reduce the sensitivity of the measurement system. For example, to distinguish that a change in output signal readings from a test sample are the result of the presence of a microorganism instead of the result of detector variability, greater changes in the output measurements may be required. In other words, detector variability may affect a threshold measurement required for determination of the presence of an analyte in a sample. In some embodiments, the devices, systems, and methods described herein provides an absolute measurement of sample, such as an absolute measurement of pH. An absolute measurement is obtained because the sensors incorporated in the culture vial does not require calibration. In some embodiments, a sensor is calibrated before it is positioned on the interior of the culture vial. In some embodiments, an indicator compound is blended into the material used to manufacture the culture vial, optionally at a specified concentration. In some embodiments, the sensor or the indicator compound is responsive to fluorescence or phosphorescence excitation or interrogation by a colorimeter system energy source. In some embodiments, the sensor or the indicator compound is excited and the excitation signal corresponds to a property or characteristic of the sample, such as to a pH level of the sample. In any of these embodiments, incorporation of the sensor or indicator compound eliminates the need to make a reading relative to another reference point such as a time-based reference reading or a standard analytical reference.

Figure 5:
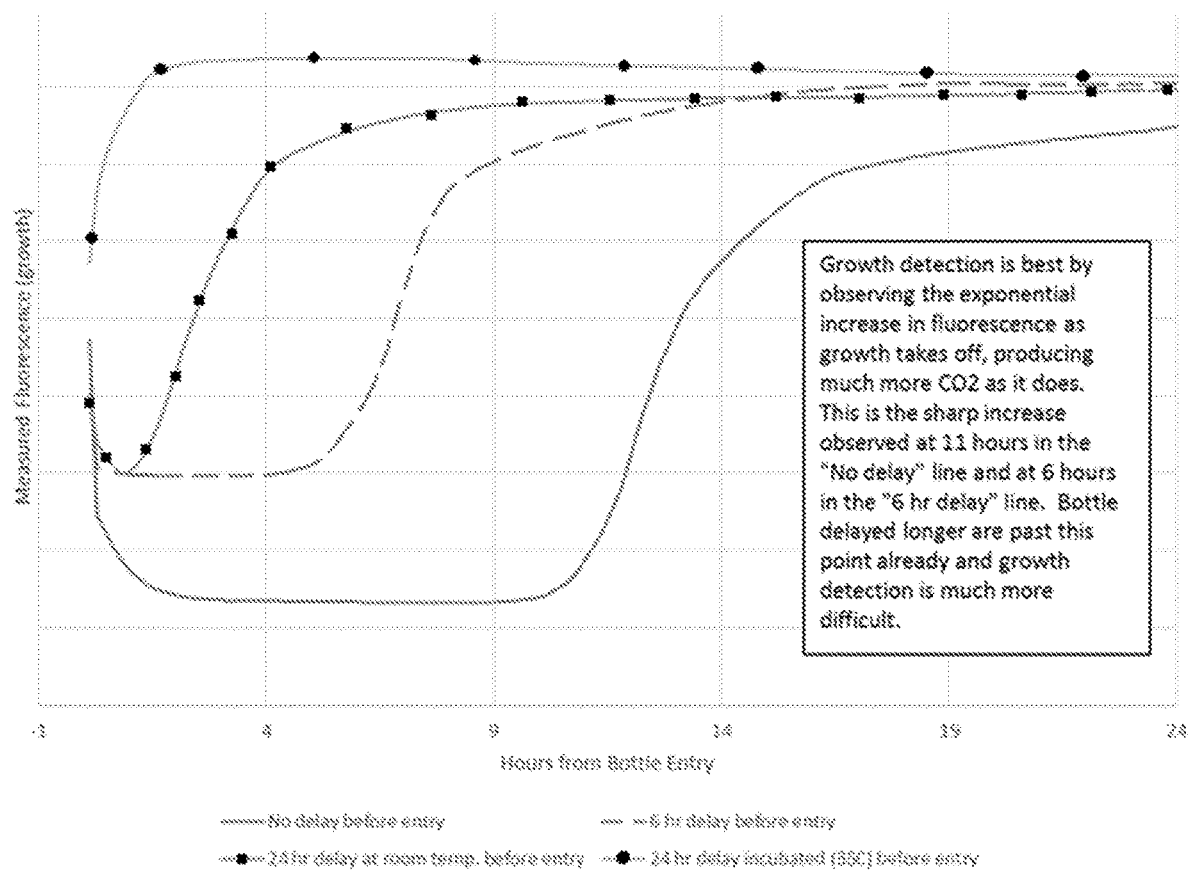
FIG. 5 depicts a graph showing the growth of pathogens in a blood culture system, wherein delayed vial entry confounds accurate readings of growth of pathogens.

In traditional culture measurement systems, there is often a delay between the time the sample is collected and injected into a test vial and the time the vial is placed in the measurement system. In some cases, the inoculated vial is placed within the measurement system after a number of hours or even a number of days, for example over a weekend. This means the initial detector reading may not be taken for 24-72 hours after the vial has been inoculated with the sample. The time period between when the sample is placed in the vial and when the vial is placed into the measurement instrument is commonly referred to as Delayed Vial Entry (DVE). The DVE time period may allow for the growth of bacteria or other microorganisms prior to placement of the vial within the measurement system. The growth of bacteria or other microorganisms prior to placement in the measurement system may affect the initial detector reading reference signal and, consequently, the test data normalized using the initial detector reading reference signal. The DVE is graphically depicted in FIG. 5. As shown in FIG. 5, a sample is collected at an initial time-point, and then analyzed at a later time point (analyzed at time 0, referred to as "bottle entry", e.g. in reference to being placed in a reader). Following bottle entry, the growth detection takes place. Where there is no delay between sample collection and bottle entry, growth detection may be reliably analyzed. In contrast, delaying bottle entry from the time of sample collection results in difficult and unreliable growth detection. During the time from sample collection to bottle entry, pathogens in the sample undergo undetected pathogen growth. For example, this undetected growth could be due to a lack of a detectable change in fluorescence in systems that require a relative measure of fluorescence to detect bacterial growth (e.g., FIG. 5, 24 hour delay incubation at 35° C. In some embodiments, the devices, systems, and methods described herein are not intended to halt, delay, or decelerate the growth of pathogens that may be present in a test sample. Obtaining an absolute measurement affords the ability to set a threshold output signal level from the sensor or indicator compound. In some embodiments, a signal that exceeds the threshold output signal level provides immediate feedback to the clinician that an excessive amount of pathogen growth has occurred in the test sample and a remedial action of acquiring another test sample is required. This immediate feedback saves time for a delayed vial entry to be detected.

In traditional culture measurement systems, an initial detector reading reference signal may be affected by sensor temperature fluctuations. Ambient sensor temperature fluctuations can be caused by external factors such as inadequate control of the ambient environment by the end-user of the sensor and/or sensor equipment, changes in vial temperature after entry into the system, and air movement through the measurement system. These temperature variations affect the partial pressure of gas within the vial, the diffusion rate of gas at the sensor, the pH indicator absorption, the emission of a signal (such as fluorescent, phosphorescent, or colorimetric emission). Sensor temperature fluctuations may require compensation to provide accurate readings. In some embodiments, the devices, systems, and methods described herein reduce or eliminate measurement variation due to temperature fluctuations by using a pH sensor that is not sensitive to temperature over the range of temperatures to which a cultures sample is subjected. For example, in some embodiments, the sensitivity of the pH sensor is, or is less than, ±0.5 pH at a temperature of between 10 and 50° C. For example, the sensitivity of the pH sensor may vary by pH in an amount of 0.01, 0.02, 0.03, 0.04, 0.05, 0.06, 0.07, 0.08, 0.09, 0.1, 0.2, 0.3, 0.4, or 0.5 pH, or a pH variation within a range defined by any two of the aforementioned values at a temperature of 10, 15, 20, 25, 30, 35, 40, 45, or 50° C., or at a temperature within a range defined by any two of the aforementioned values. In some embodiments, incorporation of the sensor into the culture vial reduces the temperature dependent variables, because an improved pH sensor having reduced temperature sensitivity is used rather than the traditional complex polymer based sensor and pH sensor containing a pH indicator and fluorescent compound, thereby improving accuracy of measurements obtained during temperature fluctuations.

In traditional culture measurement systems, the measurement and data processing techniques may also result in delayed detection of the presence of an analyte of interest. Signal changes from noise sources (user interaction, temperature changes, etc.) can appear to be organism growth. Algorithms used to process the detector data may use moving averages to compensate for these signal changes. Smoothing the signal using moving averages can reduce the random noise, but may also delay detection of signal changes caused by organism growth. Optical blood culture sensor systems must also distinguish impulse noises (such as bottle movements and drawer slams) from organism growth, so algorithms that process detected signals in these systems employ some forms of delay to ensure measured signal changes are sustained, for example. Such sustained signal changes are more likely to occur when the signal changes are due to organism growth in the blood culture bottle rather than impulse noises. This built-in delay, however, can contribute to longer wait times from the time a sample is collected to the time a blood culture test result is generated. Thus, the signal to noise ratio may be high enough to accurately measure a sample when analyzed for periods of greater than 10 minutes. In contrast, in some embodiments of the devices, systems, and methods described herein, the signal to noise ratio for measuring a sample requires only a single measurement, two measurements, or three measurements in a time period of less than 5 minutes, for example, in a time period of less than 10, 20, 30, 40, 50, or 60 seconds, or less than 1, 2, 3, 4, or 5 minutes, or in a time period within a range defined by any two of the aforementioned values. Thus, in some embodiments, the systems, methods, and devices reduce the delayed time to detection due to the enablement of absolute measurement of pH and elimination of calibration. Some embodiments of the systems reduce the incident rate of false negative test readings due to detection of positive culture that are traditionally not detected due to the delayed time to detection. Specifically, when a detection time is delayed, the logarithmic growth portion of the growth curve may have occurred prior to measurement.

In traditional culture measurement systems, the sensors that are used employ a multi-component chemical-based formulation that may include greater than ten components. Any variation in a single component of the sensor, such as chemical property or purity, may adversely affect sensor performance. Further, any delay or interruption of supply in a single component of the sensor may result in halted production of a sensor, and thus in delayed production of culture vials. For example, when a single component is no longer available, manufacturing may be halted or delayed, thereby negatively influencing product production output. In some embodiments, the devices, systems, and methods described herein eliminates the drawbacks of a multi-component chemical-based sensor by reducing the complexity of the sensor that is incorporated into the culture vial. In some embodiments, the sensor comprises not more than 1, 2, 3, or 4 components.

In traditional culture measurement systems, manufacture of the sensors requires the steps of sensor formulation blending, dispensing, and curing. Each sensor-manufacturing step may decrease consistent manufacture of sensors or decrease related performance uniformity. Additionally, each sensor manufacturing process result in the production of unacceptable sensors, which decreases production yield and increases product costs. These three manufacturing steps are performed sequentially, and thus, any variation in each step propagates to produce a combined aggregate variability in sensor-to-sensor uniformity. In some embodiments, the devices, systems, and methods described herein eliminates the drawbacks associated with these sensor manufacturing steps. Specifically, in some embodiments, the sensors of the systems and devices described herein do not require blending a multi-component chemical based system, dispensing such a system into culture vials, or curing such a system in a culture vial. Instead, in some embodiments, the systems and devices herein integrate a sensor, such as a pH sensor, a responsive label, or an indicator compound, into a culture vial, thereby simplifying manufacturing of a chemical formulation-based sensor.

In traditional culture measurement systems, current normalization techniques fail to provide real time feedback on measurement system component's signal quality. The system architecture of a measurement system may cause erroneous measurements to be made. For example, some light source components for exciting fluorescent materials within the sensor may degrade in emission intensity during their useful life. The performance of optical detectors can also degrade. Changes in either the energy emission from a light source component or sensitivity of optical detectors can result in inaccurate test data being reported by the measurement system. In some embodiments, the devices, systems, and methods described herein enable intensity of emission to serve as a real-time quality indicator for the assay measurement system. If the emission intensity is either too high or too low, the sensor measurement instrument may be programmed to automatically disregard the measurement assay test vial or vial measurement test station displaying an intensity outside of a specified value range. For example, the system may include a processor that is configured to disregard measurement readings that are above or below a certain range, such as that are greater than 2, 3, 4, 5, 6, 7, 8, 9, or 10 times greater than a normal expected reading or that are less than 0.5, 0.1, 0.05, or 0.01 times less than a normal expected reading.

In some embodiments, the devices, systems, and methods described herein utilize existing culture vials, readers, and detectors, but incorporate improved sensors that overcome the drawbacks associated with traditional culture measurement systems.

Embodiments of the Culture Measurement Devices and Systems

Embodiments provided herein relate to culture measurement devices and systems. In some embodiments, the devices include a culture vial comprising a sensor. In some embodiments, the systems further include a reader or detector. In some embodiments, the sensor measures pH of a sample that is placed within the vial. In some embodiments, the measurement of pH correlates to the growth of a pathogen in the sample.

Some embodiments provided herein relate to culture measurement devices including a culture vial comprising a pH sensor positioned on an interior surface of the culture vial. In some embodiments, the pH sensor is configured to measure the pH of a test sample. In some embodiments, the pH sensor is configured to transmit a signal of the measure of pH to a reader. In some embodiments, the reader is configured to obtain the signal of the measure of pH from the pH sensor. The signal of the measure of pH may be transmitted to the reader wirelessly or through electrical leads. In embodiments where the signal is transmitted wirelessly, a measure of pH may be obtained by the pH sensor, and the signal is transmitted to a reader, indicating a level of pH, the presence, absence, or change in an amount of pathogen, or a level of an analyte. In embodiments wherein the signal is transmitted through electrical leads, the electrical leads may pass through the culture vial through a bottom portion of the culture vial or through a septum of the culture vial. The electrical leads may act as a conduit for signal transmission to the reader and may act as a conduit for providing power to the pH sensor. In some embodiments, the devices and systems further include an electrical power source. In some embodiments, the system further includes a potentiostat that provides electrical power to the electrical leads of the pH sensor and receives an electrical current reading from the pH sensor. In some embodiments, the pH sensor is configured to be wirelessly powered.

In some embodiments, the signal is transmitted through the electrical leads to the reader, indicating a level of pH, the presence, absence, or change in an amount of pathogen, or a level of an analyte. In any of the embodiments, the reader includes a processor that is capable of correlating the pH level to a quantity or change in quantity of a pathogen. In any of the embodiments, the reader includes a display indicating results of the measurement, for example, indicating to the user the pH level, the quality of the sample, or the presence or quantity of a pathogen. In some embodiments, the reader is configured to wirelessly transmit data, including results of a test, to a patient, clinician, or researcher, for example by transmitting the data to a data management system or a cloud data storage location, including, for example, to a hospital information management system, a research facility, or a clinical laboratory.

In some embodiments, the pH sensor is an ion specific field effect transistor (ISFET) sensor. In some embodiments, the pH sensor is an ion selective electrode (ISE).

In some embodiments, the pH sensor includes a permeable membrane that is positioned to separate the pH sensor from a sample placed within the culture vial, such that an exterior surface of the permeable membrane is in liquid contact with the sample, and an interior surface of the permeable membrane is in contact with the pH sensor, such that the sample is not in direct contact with the pH sensor. In some embodiments, the permeable membrane is configured to allow passage of certain components, such as ions, but prevents passage of any other components, such that the pH sensor may be capable of detecting an analyte in the sample without directly contacting the sample in order to avoid pH sensor fouling, for example.

A permeable membrane may include any suitable material for allowing permeability of specific ions. In some embodiments, a permeable membrane comprises a polymeric material. Materials that may be used in a permeable membrane may include, for example, Nafion™ (a sulfonated tetrafluoroethylene based fluoropolymer-copolymer), polyurethane, silicone, polytetrafluoroethylene, polyethylene-co-tetrafluoroethylene, polyolefin, polyester, polycarbonate, biostable polytetrafluoroethylene, homopolymers, copolymers, terpolymers of polyurethanes, polypropylene (PP), polyvinylchloride (PVC), polyvinylidene fluoride (PVDF), polybutylene terephthalate (PBT), polymethylmethacrylate (PMMA), polyether ether ketone (PEEK), cellulosic polymers, or polysulfones, or combinations thereof. In some embodiments, a permeable membrane is a bioprotective layer and is selectively permeable, allowing certain analytes (such as ions) to contact a sensor, but preventing others from contacting the sensor, thereby preventing sensor fouling.

Some embodiments provided herein relate to culture measurement devices and systems. In some embodiments, the devices include a culture vial and a responsive label positioned on an inner surface of the culture vial. In some embodiments, the systems further include a detector capable of detecting a signal from the responsive label. In some embodiments, the responsive label is positioned on the interior surface of the culture vial in such a way as to contact a sample when a sample is placed within the culture vial.

In some embodiments, the responsive label includes a permeable membrane that is positioned to separate the responsive label from a sample placed within the culture vial, such that an exterior surface of the permeable membrane is in liquid contact with the sample, and an interior surface of the permeable membrane is in contact with the responsive label, such that the sample is not in direct contact with the responsive label. In some embodiments, the permeable membrane is configured to allow passage of certain components, such as ions, but prevents passage of any other components, such that the responsive label may be capable of detecting an analyte in the sample without directly contacting the sample.

In some embodiments, the responsive label includes a pH responsive agent. A pH responsive agent is an agent that gives a response to a flux of protons contacting the responsive label and changes a spectral property of the responsive label. For example, the pH responsive agent may be a compound that emits an absorbance intensity that changes proportionally with the pH of the sample. An absorbance emission may be a fluorescent, phosphorescent, or colorimetric emission due to fluorescence or phosphorescence (luminescence) excitation or interrogation by a colorimeter system energy source. Suitable pH responsive agents may include a pigment, a dye, fluorescent dye, phosphorescent dye, chromophoric dye, organic compound or an inorganic compound.

In some embodiments, a change in absorbance of the responsive label may be measured using an excitation source and a detector. An excitation source can be a fluorescence, phosphorescence, or colorimetric excitation source, such as a light emitting diode. A detector can be a fluorescence, phosphorescence, or colorimetric detector, such as a photomultiplier.

Figure 2:
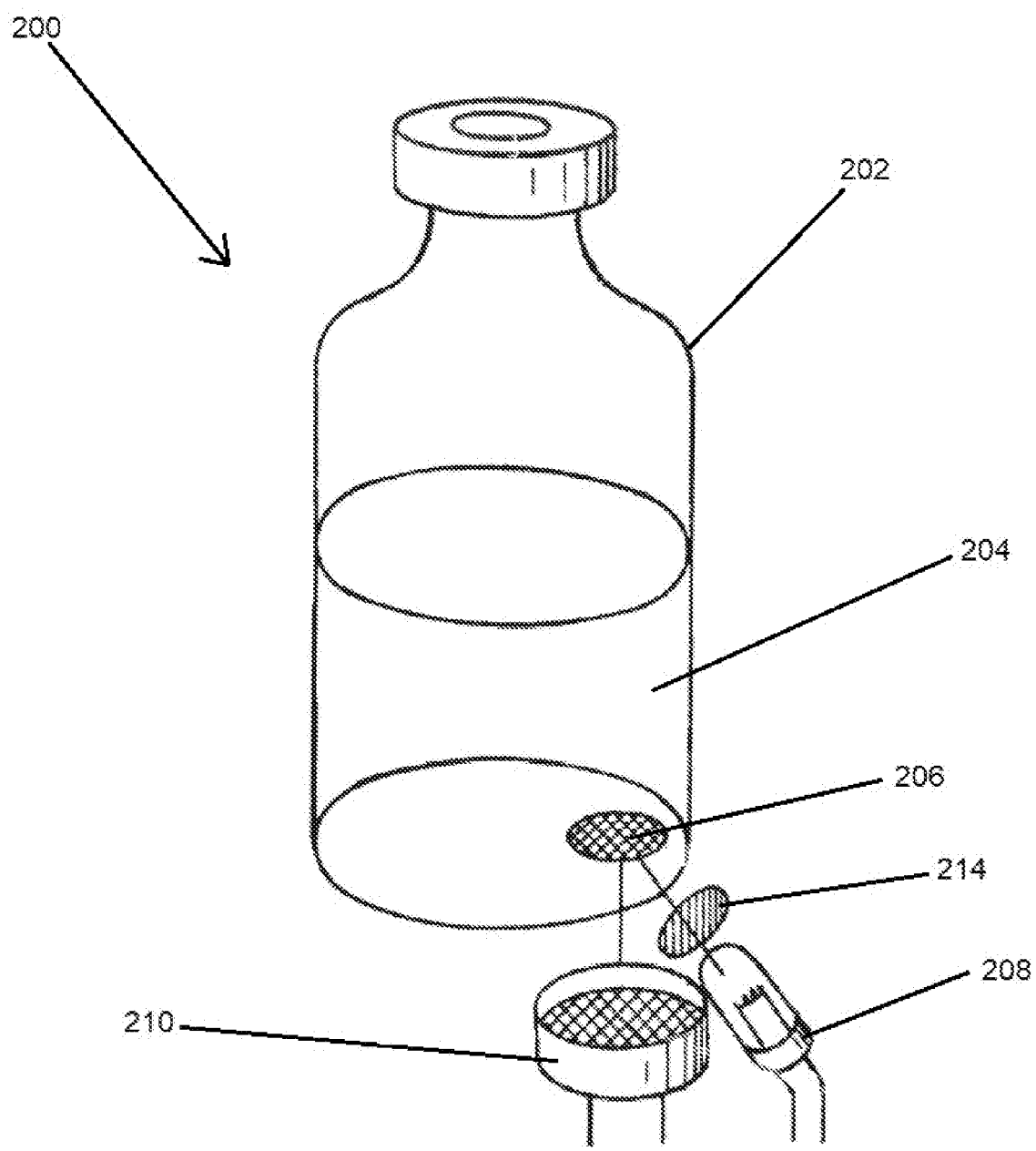
FIG. 2 depicts a schematic view of a culture measurement system in accordance with an illustrative embodiment of the present disclosure.

Embodiments of a culture system having a responsive label positioned therein is schematically depicted in FIG. 2. As shown in FIG. 2, a culture measurement system 200 includes a culture vial 202 and a responsive label 206. A sample 204 is placed in the culture vial 202 and a measure of analyte (such as pH) is measured at the responsive label 206 through a permeable membrane. An excitation source 208 excites the responsive label 206, exciting absorbance of pH responsive agents on the responsive label 206. The pH responsive agents emit an absorbance intensity signal with an intensity that changes in proportion to the pH of the sample 204, and the signal is detected by a detector 210.

The culture vial 202 is configured to receive a sample 204, such as a blood culture sample. The measurement system 200 is configured to measure pH of the sample 204 received in the culture vial 202. The pH of the sample varies or changes based on the presence or absence of a pathogen in the sample, and thus the measured pH value correlates to the presence or absence of a pathogen. The culture vial 202 includes a responsive label 206 including a pH responsive agent. The vial 202 may also include liquid media, which may support the growth of pathogens within the vial 202. The vial 202 can be, for example, a blood culture bottle.

The excitation source 208 can be activated to emit light at one or more wavelengths or ranges of wavelengths to excite the pH responsive agent of the responsive label 206. In certain embodiments, the excitation source 208 can include one or more light-emitting diodes (LEDs).

The detector 210 can be configured to detect an absorbance intensity signal emitted by the pH responsive agent of the responsive label 206 following excitation thereof. The detector 210 can be a photomultiplier, a silicon photodiode, a PIN silicon diode, a GaAsP photodiode or any other suitable photodetector. In some embodiments, the detector 210 can include a photovoltaic device, a photoresistive device, a photoconductive device, or any other suitable device for detecting an absorbance intensity signal emitted from the responsive label 206. In certain embodiments, one or a plurality of detectors 210 may be employed for measuring absorbance intensity signals emitted by the responsive label 206.

The system 200 may include one or more excitation filters 214 configured to filter light from the excitation source 208 to provide only light of a particular wavelength or range of wavelengths to the fluorescent material. For example, in certain embodiments, one or more excitation filters 214 may filter light to provide a particular wavelength or range of wavelengths to the pH responsive agent that correspond to an absorption spectrum of the pH responsive agent.

The system 200 may include one or more emission filters configured to filter light to provide a wavelength or range of wavelengths to the detector. For example, in certain embodiments, one or more emission filters may filter light to provide a wavelength or range of wavelengths to the detector that correspond to an emission spectrum of the pH responsive agent.

The pH responsive agent used in the system 200 may be selected based on the emission spectrum of the excitation source 208 and/or the specifications of the detector 210. In certain embodiments, the pH responsive agent can include one or more fluorescent dyes, phosphorescent dyes, or colorimetric dyes, or other agent that is capable of provided a detectable signal that changes in proportion to a change of pH. Such agents may include, for example, Propyl Red, P-nitrophenol, Azolitmin, Chlorophenol red, 3,6-dihydroxy xanthone, Alizarin, Bromxylenol blue, M-dinitrobenzoyleneurea, Bromthymol blue, Aurin (Aosolic acid), Neutral red, Cresol red, Bromocresol red, Bromocresol purple, Resolic acid, Nile Blue, Phenol red, Nitramine, Cresol purple, and Methyl yellow fluorophores.

As described herein, the pH responsive agent within the responsive label 206 may undergo an optical change in response to a change in analyte, for example a change in the concentration of protons in the sample, thereby indicating pH. In certain embodiments, a pH responsive agent is selected that undergoes changes in optical properties based on changes in pH in the culture vial due to changes in concentration of the analyte in the sample.

The optical change in the pH responsive agent can act as an optical filter to change the amount of light exciting the pH responsive agent or emitted from the pH responsive agent of the responsive label 206. Accordingly, a change in the concentration of the analyte of interest within the sample can cause a change in the signal detected by the detector 210 by changing the optical properties of the pH responsive agent of the responsive label 206. Consequently, changes in the intensity of the signals detected by the detector 210 may be indicative of a change in the concentration of the analyte of interest within the sample.

As an example, in certain embodiments, the system 200 is configured to detect the absence, presence, or change in a quantity of a pathogen within a sample placed within the culture vial 202. In embodiments in which it is desirable to monitor the absence, presence, or change in quantity of a pathogen, the pH responsive agent of the responsive label 206 is configured to undergo a change in absorbance as the pH changes. When pathogens grow, $CO_2$ is respired. $CO_2$ can mix with aqueous media within the vial 202 to produce carbonic acid. Increased amounts of carbonic acid result in a decrease in pH. The absorbance of the pH responsive agent is reduced as the pH within the vial 202 decreases, which allows for more excitation energy to reach the pH responsive agent within the responsive label 206, resulting in an increase in the intensity of signal emission from the pH responsive agent. The detector 210 can detect the increased signal emission intensity, which may act as an indirect measurement of an increase in $CO_2$ concentration. As described above, $CO_2$ concentration is directly correlated with pathogen growth. Accordingly, detection of an increased signal intensity by the detector 210 may indicate the presence of a pathogen within the sample.

In certain embodiments, the measurement system 200 may further include a processor configured to perform signal processing to determine presence of a pathogen based on changes in measured signal intensity by the detector 210. In certain embodiments, the processor may be part of a computing system. Such a computing system may also include one or more of a memory, an input, and a display. The memory, which can include read-only memory (ROM) or both ROM and random access memory (RAM), can be configured to provide instructions and data to the processor. For example, the memory can store one or more modules that store data values defining instructions to configure processor to perform signal processing functions. In some embodiments, the computing system is configured to wirelessly transmit data, including results of a test, to a patient, clinician, or researcher, for example by transmitting the data to a data management system or a cloud data storage location, including, for example, to a hospital information management system, a research facility, or a clinical laboratory.

Some embodiments provided herein relate to culture measurement devices and systems. In some embodiments, the devices include a culture vial comprising an indicator compound incorporated directly into the material of the culture vial. In some embodiments, the indicator compound is configured to be responsive to fluorescence or phosphorescence excitation or interrogation by a colorimeter system energy source. In some embodiments, excitation is detected by a detector. In some embodiments, the systems further include a detector capable of detecting excitation from the indicator compound. In some embodiments, the indicator compound is incorporated within an inner surface of a culture vial. For example, the indicator compound may be blended into the culture vial material (such as plastic) prior to manufacture of the culture vial, for example at a point prior to injection molding of the culture vial. In some embodiments, the indicator compound is incorporated into an inner layer of a plastic culture vial, or is incorporated within a plastic liner layer of a glass culture vial. In some embodiments, the indicator compound is positioned on the interior surface of the culture vial in such a way as to contact a sample when a sample is placed within the culture vial. In some embodiments, the indicator compound is incorporated into all or a portion of the vial. For example, the indicator compound may be incorporated into the entire culture vial, a bottom portion of the culture vial, one or more walls of the culture vial, or any segment or portion of a culture vial.

In some embodiments, the culture vials comprising an indicator compound further include a permeable membrane that is positioned to separate the indicator compound from a sample placed within the culture vial, such that an exterior surface of the permeable membrane is in liquid contact with the sample, and an interior surface of the permeable membrane is in contact with the indicator compound, such that the sample is not in direct contact with the indicator compound. In some embodiments, the permeable membrane is configured to allow passage of certain components, such as ions, but prevents passage of any other components, such that the indicator compound may be capable of detecting an analyte in the sample without directly contacting the sample. In some embodiments, the permeable membrane protects all or a portion of the inside of the vial.

In some embodiments, the culture vials comprising an indicator compound further include an impermeable membrane. In some embodiments, the impermeable membrane covers all but a sensor region of the inner surface of the culture vial, such that the sample is able to interact with only the sensor region of the culture vial, and only sensor region is capable of sensing an analyte in the sample and emitting a detectable signal. An impermeable membrane may include any material that prevents or inhibits materials from flowing through the membrane, and may include various non-porous plastics or polymeric materials.

In some embodiments, the indicator compound is a pH responsive agent. For example, the pH responsive agent may be a compound that emits an absorbance intensity that changes proportionally with the pH of the sample. An absorbance emission may be a fluorescent, phosphorescent, or colorimetric emission. Suitable pH responsive agents may include a pigment, a dye, fluorescent dye, phosphorescent dye, chromophoric dye, organic compound or an inorganic compound.

In some embodiments, a change in absorbance of the indicator compound may be measured using an excitation source and a detector. An excitation source can be a fluorescence, phosphorescence, or colorimetric excitation source, such as a light emitting diode. A detector can be a fluorescence, phosphorescence, or colorimetric detector, such as a photomultiplier.

Figure 3:
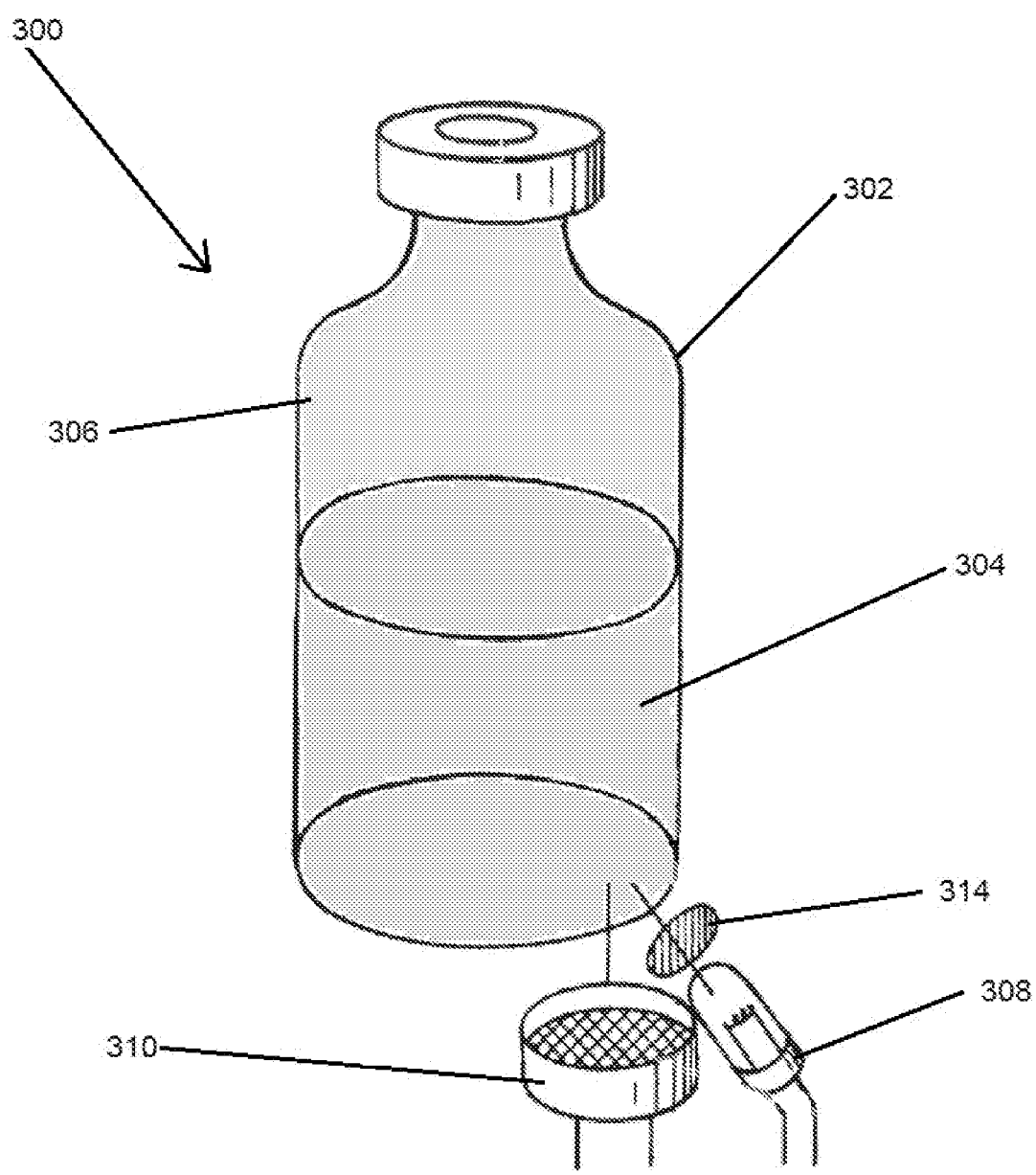
FIG. 3 depicts a schematic view of a culture measurement system in accordance with an illustrative embodiment of the present disclosure.

Embodiments of a culture system having an indicator compound incorporated therein is schematically depicted in FIG. 3. As shown in FIG. 3, a culture measurement system 300 includes a culture vial 302 and an indicator compound 306. The indicator compound 306 may be incorporated into the culture vial 302 on an inner surface or may be incorporated in an inner liner that lines the interior surface of a culture vial. A sample 304 is placed in the culture vial 302 and a measure of analyte (such as pH) is measured by measuring an absorbance signal using a detector 310. An excitation source 308 excites the indicator compound 306, exciting absorbance of the indicator compound 306. An indicator compound 306 emits an absorbance intensity signal with an intensity that changes in proportion to the pH of the sample 304, and the signal is detected by a detector 310. Excitation and detection of the indicator compound can take place at any portion of the culture vial wherein the indicator compound has been incorporated, and thus does not required that the detection take place at any particular location of the culture vial. By comparison, the culture vial of FIG. 2 requires excitation and detection of the responsive label, which is positioned on an interior location of the culture vial.

The culture vial 302 is configured to receive a sample 304, such as a blood culture sample. The measurement system 300 is configured to measure pH of the sample 304 received in the culture vial 302. The pH of the sample varies or changes based on the presence or absence of a pathogen in the sample, and thus the measure of pH is correlated to the presence or absence of a pathogen. The culture vial 302 includes an indicator compound 306, such as a pH responsive agent. The vial 302 may also include liquid media, which may support the growth of pathogens within the vial 302. The vial 302 can be, for example, a blood culture bottle.

The excitation source 308 can be activated to emit light at one or more wavelengths or ranges of wavelengths to excite the pH responsive agent of the indicator compound 306. In certain embodiments, the excitation source 308 can include one or more light-emitting diodes (LEDs).

The detector 310 can be configured to detect an absorbance intensity signal emitted by the pH responsive agent of the indicator compound 306 following excitation thereof. The detector 310 can be a photomultiplier, a silicon photodiode, a PIN silicon diode, a GaAsP photodiode or any other suitable photodetector. In some embodiments, the detector 310 can include a photovoltaic device, a photoresistive device, a photoconductive device, or any other suitable device for detecting an absorbance intensity signal emitted from the indicator compound 306. In certain embodiments, one or a plurality of detectors 310 may be employed for measuring absorbance intensity signals emitted by the indicator compound 306.

The system 300 may include one or more excitation filters 314 configured to filter light from the excitation source 308 to provide only light of a particular wavelength or range of wavelengths to the fluorescent material. For example, in certain embodiments, one or more excitation filters 314 may filter light to provide a particular wavelength or range of wavelengths to the indicator compound 306 that correspond to an absorption spectrum of the pH responsive agent.

The system 300 may include one or more emission filters configured to filter light to provide a wavelength or range of wavelengths to the detector. For example, in certain embodiments, one or more emission filters may filter light to provide a wavelength or range of wavelengths to the detector that correspond to an emission spectrum of the pH responsive agent.

The indicator compound 306 used in the system 300 may be selected based on the emission spectrum of the excitation source 308 and/or the specifications of the detector 310. In certain embodiments, the indicator compound 306 may be a pH responsive agent, such as a fluorescent dye, phosphorescent dye, or colorimetric dye, or other agent that is capable of provided a detectable signal that changes in proportion to a change of pH. Such agents may include, for example, Propyl Red, P-nitrophenol, Azolitmin, Chlorophenol red, 3,6-dihydroxy xanthone, Alizarin, Bromxylenol blue, M-dinitrobenzoyleneurea, Bromthymol blue, Aurin (Aosolic acid), Neutral red, Cresol red, Bromocresol red, Bromocresol purple, Resolic acid, Nile Blue, Phenol red, Nitramine, Cresol purple, and Methyl yellow fluorophores.

As described herein, the indicator compound 306 may undergo an optical change in response to a change in analyte, for example a change in the concentration of protons in the sample, thereby indicating pH. In certain embodiments, an indicator compound 306 is selected that undergoes changes in optical properties based on changes in pH in the culture vial due to changes in concentration of the analyte in the sample.

The optical change in the indicator compound 306 can act as an optical filter to change the amount of light exciting the indicator compound 306 or emitted from the indicator compound 306. Accordingly, a change in the concentration of the analyte of interest within the sample can cause a change in the signal detected by the detector 310 by changing the optical properties of the indicator compound 306. Consequently, changes in the intensity of the signals detected by the detector 310 may be indicative of a change in the concentration of the analyte of interest within the sample.

As an example, in certain embodiments, the system 300 is configured to detect the absence, presence, or change in a quantity of a pathogen within a sample placed within the culture vial 302. In embodiments in which it is desirable to monitor the absence, presence, or change in quantity of a pathogen, the indicator compound 306 is configured to undergo a change in absorbance as the pH changes. When pathogens grow, $CO_2$ is respired. $CO_2$ can mix with aqueous media within the vial 302 to produce carbonic acid. Increased amounts of carbonic acid result in a decrease in pH. The absorbance of the indicator compound 306 is reduced as the pH within the vial 302 decreases, which allows for more excitation energy to reach the indicator compound 306, resulting in an increase in the intensity of signal emission from the indicator compound 306. The detector 310 can detect the increased signal emission intensity, which may act as an indirect measurement of an increase in $CO_2$ concentration. As described above, $CO_2$ concentration is directly correlated with pathogen growth. Accordingly, detection of an increased signal intensity by the detector 310 may indicate the presence of a pathogen within the sample.

In certain embodiments, the measurement system 300 may further include a processor configured to perform signal processing to determine presence of a pathogen based on changes in measured signal intensity by the detector 310. In certain embodiments, the processor may be part of a computing system. Such a computing system may also include one or more of a memory, an input, and a display. The memory, which can include read-only memory (ROM) or both ROM and random access memory (RAM), can be configured to provide instructions and data to the processor. For example, the memory can store one or more modules that store data values defining instructions to configure processor to perform signal processing functions. In some embodiments, the computing system is configured to wirelessly transmit data, including results of a test, to a patient, clinician, or researcher, for example by transmitting the data to a data management system or a cloud data storage location, including, for example, to a hospital information management system, a research facility, or a clinical laboratory.

In any of the embodiments described herein, the sample is a fluid biological sample, such as a blood sample, a serum sample, a cerebrospinal fluid sample, or other biological sample, a food sample, or an environmental sample, or a culture of any of the aforementioned samples, wherein detection of an analyte is desired. In some embodiments, the sample is a blood sample, and the sample is analyzed to measure a pathogen by measuring the pH of the sample.

In some embodiments, a culture vial is manufactured and configured for implementation using existing measurement systems. For example, a culture vial may be of the same or similar size and shape of existing culture vials to allow measurement of a sample within existing measurement platforms. In any of the embodiments provided herein, the culture vial is of suitable material for measurement of a sample. In some embodiments, the culture vial is glass or plastic. In some embodiments, the culture vial allows optical interrogation of the sample, and therefore allows an optical signal to pass through the culture vial, for example, an absorbance emission, such as a fluorescent, phosphorescent, or colorimetric emission.

Embodiments of Methods of Detecting an Analyte

Some embodiments provided herein relate to methods of detecting an analyte in a sample. In some embodiments, the methods include inoculating a culture vial as described in any one or more of the embodiments herein with a sample and measuring a pH of the sample. In some embodiments, the pH of the sample may be measured at a first and subsequent time points to provide a measure of a change of pH over time. For example, a measure of pH may be performed at a first time point, a second time point, a third time point, a fourth time point, or more time points. In some embodiments, a measure of pH is determined immediately after inoculating the culture vial with the sample.

In some embodiments, methods of detecting an analyte in a sample utilize culture measurement devices and systems, wherein the culture measurement devices and system includes a pH sensor positioned on an inner surface of the blood culture vial, e.g. as described in one or more of the embodiments above and elsewhere herein. In some embodiments, the methods include inoculating a culture vial having a pH sensor positioned on the interior surface of the culture vial with a sample, allowing the sample to incubate for a period of time to allow the pH sensor to equilibrate, and measuring a signal from the pH sensor at a reader. In some embodiments, the reader is configured to obtain a signal from the pH sensor through electrical leads or wirelessly. In some embodiments, the reader includes a processor. In certain embodiments, the processor may be part of a computing system. Such a computing system may also include one or more of a memory, an input, and a display. The memory, which can include read-only memory (ROM) or both ROM and random access memory (RAM), can be configured to provide instructions and data to the processor, e.g., as described above and elsewhere herein. For example, the memory can store one or more modules that store data values defining instructions to configure processor to perform signal processing functions. In this embodiment, the measure of pH is directly determined using a pH sensor, which may be an ISFET or an ISE.

In some embodiments, methods of detecting an analyte in a sample utilize culture measurement devices and systems, wherein the culture measurement devices and systems include a responsive label positioned on an inner surface of the culture vial, e.g. as described in the embodiments above and elsewhere herein. In some embodiments, the methods include inoculating a culture vial having a responsive label positioned on the interior surface of the culture vial with a sample, allowing the sample to incubate for a period of time to allow the responsive label to equilibrate, exciting the responsive label with an excitation source, and detecting an emitted absorbance intensity signal at a detector. In this embodiment, the measure of pH is determined by measuring an intensity of the signal, wherein the intensity of the signal correlates to the pH of the sample. In some embodiments, decreased pH results in increased signal intensity due to increased excitation energy at the responsive label.

Figure 4:
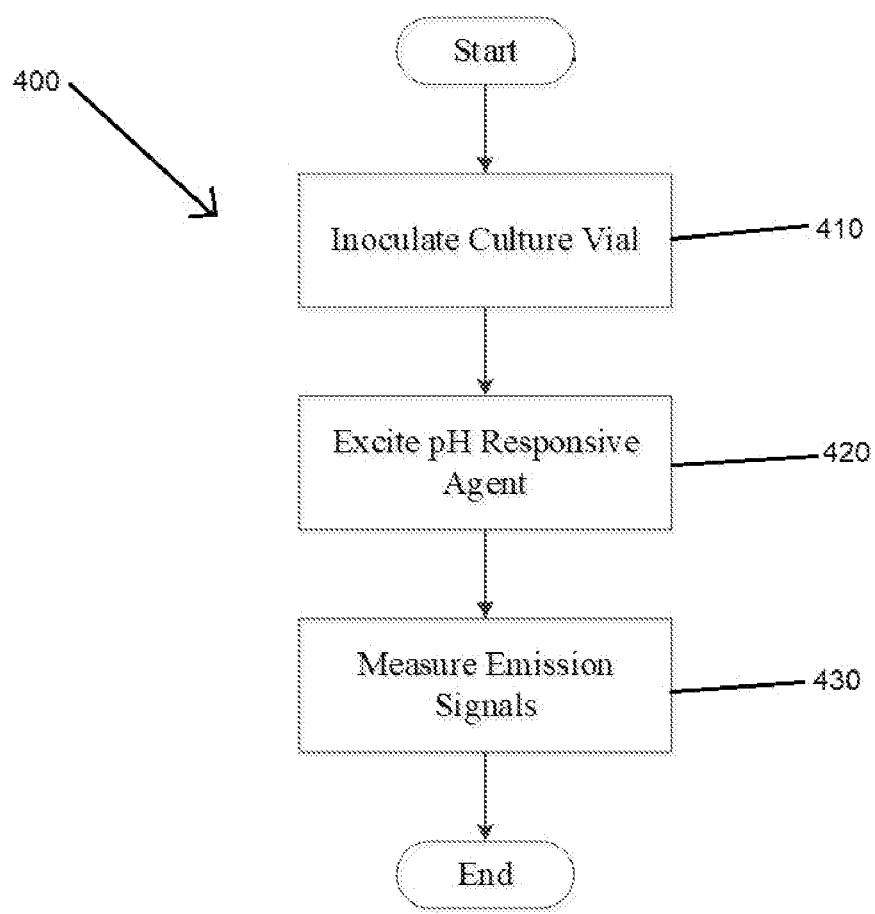
FIG. 4 depicts a flowchart showing a process for detecting signals indicating the presence of an analyte of interest in a culture of a blood sample in accordance with an illustrative embodiment of the present disclosure.

FIG. 4 depicts an exemplary process 400 for determining the presence of an analyte in a blood culture sample. The process 400 begins at a step 410, wherein a culture vial having a responsive label, such as vial 202 as described with respect to FIG. 2, is inoculated with a sample. The responsive label can include a pH responsive agent as described with reference to FIG. 2.

After the culture vial is inoculated, the process 400 moves to a step 420, wherein excitation light is transmitted to the test vial at an excitation frequency of the pH responsive agent. The excitation frequency can be a frequency or range of frequencies within an absorption spectrum of the pH responsive agent. The light may be transmitted by an excitation source, such as the excitation source 208 as described with respect to FIG. 2.

After the light is transmitted to the test vial, the process 400 moves to a step 430, wherein an intensity of signal emitted from the test vial is measured. As described herein, the absorbance intensity signal may be emitted by the pH responsive agent due to responsiveness to fluorescent or phosphorescent (luminescent) excitation or interrogation by a colorimeter system energy source. The signal can be measured by a detector, such as detector 210 as described with respect to FIG. 2. In certain embodiments, measuring the intensity of the signal at step 430 includes filtering the signal using an emission filter.

Although detection of the presence of an analyte of interest in a blood culture sample is described with respect to the process 400 described in FIG. 4, one of skill in the art would understand that methods described herein are not limited to blood culture samples, but may be applicable to the detection of microorganisms in any medium known in the art.

In some embodiments, methods of detecting an analyte in a sample utilize culture measurement devices and systems, wherein the culture measurement devices and systems include a culture vial comprising an indicator compound incorporated onto an inner surface of the culture vial, e.g. as described in the embodiments above and elsewhere herein. In some embodiments, the methods include inoculating a culture vial having an indicator compound incorporated onto an interior surface of the culture vial with a sample, allowing the sample to incubate for a period of time to allow the indicator compound to equilibrate, exciting the indicator compound with an excitation source, and detecting an absorbance intensity signal at a detector. In this embodiment, the measure of pH is determined by measuring an intensity of the signal, wherein the intensity of the signal correlates to the pH of the sample. In some embodiments, decreased pH results in increased signal intensity due to increased excitation energy at the indicator compound.

In any of the embodiments of the methods of detecting an analyte, when pathogens grow, $CO_2$ is respired. $CO_2$ can mix with aqueous media within the culture vial to produce carbonic acid. Increased amounts of carbonic acid result in a decrease in pH. A decrease in pH is measured using the methods described herein, and thus, detection of the pH correlates with a measure of the presence of a pathogen in the sample.

In any of the embodiments of the methods of detecting an analyte, equilibration of the sensor (pH sensor, responsive label, or indicator compound) takes place for a period of time including 10, 20, 30, 40, 50, or 60 seconds or 1, 2, 3, 4, 5, 10, 15, 30, 45, or 60 minutes, or an amount of time within a range defined by any two of the aforementioned times. A second or subsequent measure may be taken at a second time following the first measurement time. A second or subsequent measure may take place 1, 2, 3, 4, 5, 10, 15, 30, 45, or 60 minutes or 1, 2, 3, 4, 5, 6, 10, 12, 15, 18, 21, or 24 hours following the first measurement, or at a time point within a range defined by any two of the aforementioned values. Subsequent time points may similarly be taken at time intervals useful for determination of the presence of a pathogen in a sample.

Embodiments of Methods of Making Culture Measurement Devices and Systems

Some embodiments provided herein relate to methods of making the devices and systems of any one or more of the embodiments described herein. In some embodiments, a culture vial is obtained and a pH sensor is incorporated at an inner surface thereof, such that the pH sensor is immersed in a sample when sample is inoculated in the culture vial, e.g. as described in one or more of the embodiments above and elsewhere herein. In some embodiments, the culture vial includes ports for electrical leads of the pH sensor to pass through the culture vial. In some embodiments, the ports are located at a bottom portion of the culture vial, close in proximity to the position of the pH sensor. In some embodiments, the ports are located in a septum that caps the culture vial.

In some embodiments, a culture vial is manufactured having a responsive label positioned therein, e.g. as described in one or more of the embodiments above and elsewhere herein. In some embodiments, the responsive label is positioned on an inner surface of the culture vial. In some embodiments, the responsive label include a permeable membrane, which acts as a bioprotective layer between the responsive label and the sample in the culture vial. In some embodiments, the responsive label is adhered to an inner surface of a culture file an adhesive, such a double-layered tape or other biocompatible adhesive.

In some embodiments, a culture vial is manufactured having an indicator compound incorporated into an inner surface of the culture vial, e.g. as described in one or more of the embodiments above and elsewhere herein. In some embodiments, the indicator compound is mixed with a culture vial material prior to manufacture of the culture vial, such that the indicator compound forms an integrated component of the culture vial during manufacture of the culture vial. In some embodiments, the culture vial is a plastic culture vial, and the culture vial is formed using injection molding techniques. In some embodiments, the culture vial is a glass culture vial, and the indicator compound is incorporated into a plastic layer that lines an interior surface of the glass culture vial. The indicator compound may be incorporated into the plastic layer by mixing the indicator compound with plastic layer material prior to formulation of the plastic layer. In some embodiments, the indicator compound is integrated into all or a portion of the culture vial. For example, the indicator compound may be integrated into the entire culture vial or only a portion of the culture vial, such as only in a bottom portion of the culture vial, only in one or more walls of the culture vial, or only in a segmented portion or region of the culture vial. In some embodiments, the culture vial having an indicator compound further includes a permeable membrane over all or a portion of the inside of the culture vial, which acts as a bioprotective layer between the indicator compound and the sample in the culture vial. In some embodiments, the culture vial having an indicator compound further includes an impermeable membrane over all or a portion of the inside of the culture vial. A region where the impermeable membrane is not present is a sensor region, and is a region where the sample may interact with the indicator compound that is integrated in the culture vial.

In any of the embodiments for making a culture measurement device or system, the particular culture vial (whether including a pH sensor, a responsive label, or an indicator compound, e.g. as described in one or more of the embodiments above and elsewhere herein) may be manufactured for use in an existing measurement system. For example, the culture vial may be of the same or similar size and shape of existing culture vials, such that the culture vial may be seamlessly incorporated into existing measuring systems. In some embodiments, the culture vial is manufactured to be the same or similar to BD BACTEC™ blood culture system vials manufactured by Becton, Dickinson and Company, such that the sample in the culture vial may be measured using the BD BACTEC™ system.

Implementations disclosed herein provide devices, systems, and methods for measuring an analyte in a sample using a pH sensor, a responsive label, or an indicator compound to determine the pH of the sample. One skilled in the art will recognize that these embodiments may be implemented in hardware, software, firmware, or any combination thereof.

In addition to the benefits described above, embodiments of the devices, systems, and methods described herein can be advantageously implemented without changing consumable components in current blood culture measurement systems. For example, implementations of the presently disclosed technology can be implemented without changing aspects of the assay bottle including its contents compromised of media or nutrient solution.

It will be further understood that the embodiments of the disclosed technology are not limited to blood culture measurement devices and systems, and can be applied to other types of optical detection devices or systems.

The functions and configurations of the reader, detector, or processor described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

In any one or more embodiments of the devices, systems, or methods, a measure of pH value may be wirelessly transmitted to a system component for analysis of such data to derive bacterial growth curves. In some embodiments, the transmission of pH data analysis is transmitted to a centralized system or laboratory, such as an information system or cloud repository, for example, such that the analysis may be accesses by researchers, patients, or clinicians.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the present disclosure. In other words, unless a specific order of steps or actions is required for proper operation of the method that is being described, the order and/or use of specific steps and/or actions may be modified without departing from the scope of the present disclosure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed.

A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use embodiments of the present disclosure. Various modifications to these implementations will be readily apparent to those skilled in the art, and the generic principles defined herein may be applied to other implementations without departing from the spirit or scope of the present disclosure. Thus, the present disclosure is not intended to be limited to the implementations shown herein but is to be accorded the widest scope consistent with the principles and novel features disclosed herein.

What is claimed is:

1. A culture vial for measuring blood culture pH, the culture vial comprising a pH sensor positioned on an interior surface of the blood culture vial, and configured to transmit a signal of pH measurement,
    wherein the culture vial is a blood culture bottle including a liquid media which supports the growth of pathogens within the bottle, wherein the bottle comprises a neck portion comprising an opening at the top of the neck portion, and a septum that caps the opening in the neck of the blood culture bottle, wherein the volume of the blood culture bottle is sufficient to receive a blood sample of 10 ml,
    wherein the pH sensor is an ion specific field effect transistor, or an ion selective electrode, and
    i.) wherein the pH sensor comprises electrical leads that pass through the blood culture vial and are configured to connect to a reader configured to obtain the signal from the pH sensor; or
    ii.) wherein the pH sensor is configured to wirelessly communicate with a reader configured to obtain the signal from the pH sensor.

2. The culture vial of claim 1, wherein the culture vial further comprises a permeable membrane layer that separates the pH sensor from contents of the blood culture vial.

3. The culture vial of claim 2, wherein the permeable membrane comprises polytetrafluoroethylene, polyethylene-co-tetrafluoroethylene, polyurethane, or cellulosic material.

4. A system comprising the blood culture vial of claim 1, and a reader configured to obtain the signal from the pH sensor.

5. The system of claim 4, wherein the pH sensor comprises electrical leads that pass through the blood culture vial and connect to the reader.

6. The system of claim 5, wherein the electrical leads pass through a bottom portion of the blood culture vial or pass through the septum of the blood culture vial.

7. The system of claim 4, wherein the pH sensor is configured to wirelessly communicate with the reader.

8. The system of claim 7, wherein the reader is configured to wirelessly transmit analyzed data to an information management system or a cloud data storage location.

9. The system of claim 4, wherein the pH sensor is configured to be wirelessly powered.

10. The culture vial of claim 1, wherein the electrical leads pass through a bottom portion of the blood culture vial or pass through the septum of the blood culture vial.

11. The culture vial of claim 1, wherein the pH sensor is configured to wirelessly communicate with the reader.

12. The culture vial of claim 11, wherein the pH sensor is configured to be wirelessly powered.

13. A method of measuring pH in a blood culture sample, comprising:
    inoculating a blood culture vial of claim 1 in a blood culture system with a blood culture sample; and
    measuring a pH of the blood culture sample by detecting a signal of pH measurement.

* * * * *